UNITED STATES PATENT OFFICE.

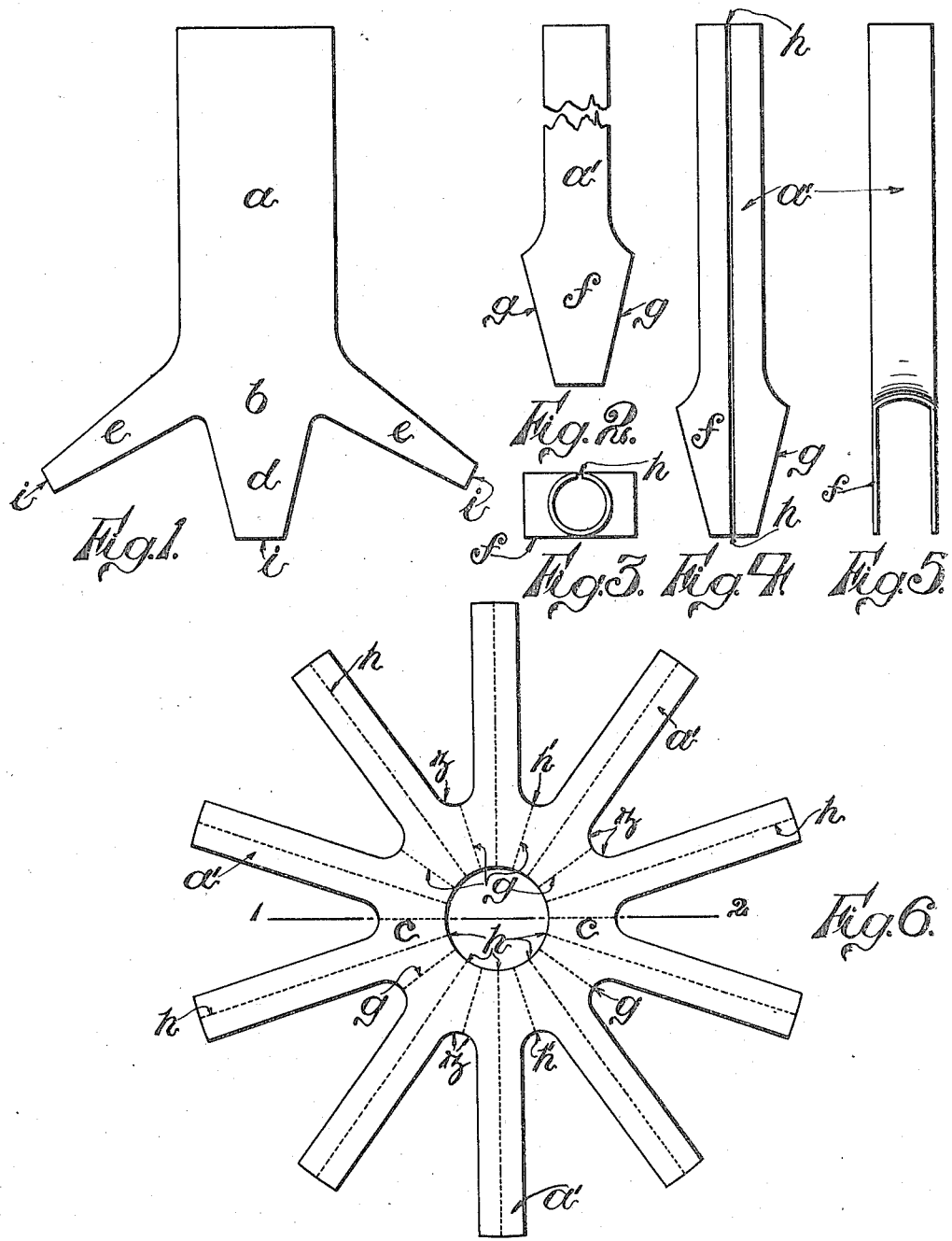

CHARLES SMITH CHALLINER AND JOSEPH ALBERT CHALLINER, OF MANCHESTER, ENGLAND.

METALLIC WHEEL-SPOKE.

1,152,292. Specification of Letters Patent. Patented Aug. 31, 1915.

Application filed December 22, 1913. Serial No. 808,236.

*To all whom it may concern:*

Be it known that we, CHARLES SMITH CHALLINER and JOSEPH ALBERT CHALLINER, subjects of the King of Great Britain and Ireland, and residents of Manchester, in the county of Lancaster, England, engineers, have invented certain new and useful Improvements in Metallic Wheel-Spokes, of which the following is a specification.

Our invention relates to improvements in the construction of sheet metal wheels for motor road and other vehicles that is to say, to that class in which the rim, spokes and hub are made from one or more parts of sheet steel or the like assembled together and secured by a welding or brazing process at the contiguous joints.

Our invention will be fully described with reference to the accompanying drawings in which:—

Figure 1 is a plan view of a blank from which each spoke is made, Fig. 2 front elevation of a spoke, Fig. 3 plan of same, Fig. 4 back elevation and Fig. 5 side elevation, Fig. 6 front elevation showing the spokes assembled together and welded, Fig. 7 sectional plan on lines 1—2 of Fig. 6.

In accordance with our invention we construct each spoke from a sheet metal blank $a$, Fig. 1 adapted at its inner end $b$, when bent to proper form, to constitute a portion of the center or hub $c$ of the wheel, as shown in Fig. 6 so that when the whole of the spokes $a^1$ are secured together a homogenous center or hub will be formed. In other words the inner end of each spoke in blank form is provided with a central portion $d$ and with two side portions $e$ splayed out so that when the blank is bent to the required shape of the spoke the central portion forms the front and the splayed portions the back of a wedge-shaped portion $f$ whose edges $g$ are on substantially radial lines. The longitudinal joint $h$ in the spoke is arranged at the back so that it is entirely out of sight. Reinforcing rings $k$ are secured in the hub portion $c$ as shown in Fig. 7, when desirable, and bolt holes $m$ are provided for securing a spindle bearing or sleeve of approved construction in the hub portion.

The spoke blanks $a$ are formed to give a curved shoulder $z$ where they join each other on the radial lines previously referred to and also to give a curved surface between the spokes from front to back so providing a strong and neat construction. The spokes are welded electrically or otherwise on their longitudinal joints $h$ at the back and likewise on the radial joints $h^1$ so providing a complete hub center and leaving only the welded joints visible from front to back between the spokes.

What we claim is:

In a device of the class described, spokes formed of sheet metal, each spoke having at one end portion three wedge-shaped tangs, one tang being arranged at one side of the spoke and being as wide as the remaining tangs together which are arranged at the other side of the spoke, the adjacent edges of the wide and narrow tangs of each spoke being secured to the corresponding edges of the wide and narrow tangs of the two spokes on each side of it, and the said spokes being secured together by their said tangs and arranged so that they radiate from a common center.

In testimony whereof we have hereunto set our hands in the presence of two witnesses.

CHARLES SMITH CHALLINER.
JOSEPH ALBERT CHALLINER.

Witnesses:
 WILLIAM W. TAYLOR,
 AMY EVELINE EVINS.

Copies of this patent may be obtained for five cents each, by addressing the "Commissioner of Patents, Washington, D. C."